US008925316B2

(12) United States Patent
Andrasko et al.

(10) Patent No.: US 8,925,316 B2
(45) Date of Patent: Jan. 6, 2015

(54) CONTROL SYSTEMS AND METHODS FOR SUPER TURBO-CHARGED ENGINES

(75) Inventors: Steven J. Andrasko, Oshkosh, WI (US); Christopher J. Kalebjian, Columbus, MI (US); Yun Xiao, Ann Arbor, MI (US); Bryan A. Kuieck, Estero, FL (US)

(73) Assignee: GM Global Technology Operations LLC, Detroit, MI (US)

( * ) Notice: Subject to any disclaimer, the term of this patent is extended or adjusted under 35 U.S.C. 154(b) by 452 days.

(21) Appl. No.: 13/345,958

(22) Filed: Jan. 9, 2012

(65) Prior Publication Data

US 2013/0174545 A1 Jul. 11, 2013

(51) Int. Cl.
| *F02B 33/44* | (2006.01) |
| *F02B 33/00* | (2006.01) |
| *F02B 37/14* | (2006.01) |
| *F02B 37/16* | (2006.01) |
| *F02B 37/12* | (2006.01) |
| *F02D 23/00* | (2006.01) |
| *F02B 37/04* | (2006.01) |
| *F02D 41/00* | (2006.01) |

(52) U.S. Cl.
CPC ............... *F02B 37/16* (2013.01); *F02B 37/127* (2013.01); *F02B 37/12* (2013.01); *F02B 37/14* (2013.01); *F02D 23/00* (2013.01); *F02D 2200/0406* (2013.01); *F02B 37/04* (2013.01); *F02D 41/0007* (2013.01); *Y02T 10/144* (2013.01)
USPC .................. 60/611; 60/612; 60/607; 60/608; 123/562

(58) Field of Classification Search
CPC .......... F02B 37/12; F02B 37/14; F02B 37/16; F02B 37/127; F02B 37/04; F02D 23/00; F02D 2200/0406; F02D 41/0007; Y02T 10/144
USPC ............ 60/611, 612, 607–609; 123/561–562; 701/102, 104
IPC ........................................................ F02B 37/14
See application file for complete search history.

(56) References Cited

U.S. PATENT DOCUMENTS

| 4,730,457 | A | * | 3/1988 | Yamada et al. ................. 60/609 |
| 5,335,500 | A | * | 8/1994 | Wunderlich et al. ............ 60/609 |
| 6,079,211 | A | * | 6/2000 | Woollenweber et al. ....... 60/612 |
| 6,112,523 | A | * | 9/2000 | Kamo et al. ..................... 60/612 |
| 6,279,550 | B1 | * | 8/2001 | Bryant ............................ 60/609 |
| 6,343,473 | B1 | * | 2/2002 | Kanesaka ........................ 60/609 |
| 6,688,104 | B2 | * | 2/2004 | Baeuerle et al. ................ 60/608 |
| 6,938,420 | B2 | * | 9/2005 | Kawamura et al. ............. 60/612 |
| 7,246,490 | B2 | * | 7/2007 | Sumser et al. .................. 60/612 |
| 7,251,989 | B2 | * | 8/2007 | Baeuerle .................... 73/114.37 |

(Continued)

FOREIGN PATENT DOCUMENTS

| JP | 62091624 | A | * | 4/1987 | ............. F02B 37/14 |
| JP | 2004076659 | A | * | 3/2004 | ............. F02B 37/14 |

(Continued)

*Primary Examiner* — Thai Ba Trieu
(74) *Attorney, Agent, or Firm* — Cantor Colburn LLP

(57) ABSTRACT

A method of controlling airflow of an engine system is provided. The method includes determining a supercharger operating mode and a turbocharger operating mode based on engine load; selectively generating a control signal to a turbocharger based on the turbocharger operating mode; and selectively generating a control signal to a supercharger bypass valve based on the supercharger operating mode.

18 Claims, 3 Drawing Sheets

(56) References Cited

U.S. PATENT DOCUMENTS

| | | | |
|---|---|---|---|
| 7,530,229 B2 * | 5/2009 | Akita | 60/612 |
| 7,644,586 B2 * | 1/2010 | Yamagata | 60/612 |
| 7,810,329 B2 * | 10/2010 | Noodt et al. | 60/612 |
| 8,302,397 B2 * | 11/2012 | Liu et al. | 60/612 |
| 8,371,120 B2 * | 2/2013 | Chadwell | 60/611 |
| 2004/0216519 A1 * | 11/2004 | Baeuerle | 73/118.1 |
| 2008/0011278 A1 * | 1/2008 | Yamagata | 60/609 |
| 2009/0007563 A1 * | 1/2009 | Cooper et al. | 60/612 |
| 2009/0265080 A1 * | 10/2009 | Fry et al. | 701/103 |
| 2012/0090319 A1 * | 4/2012 | Mond et al. | 60/609 |
| 2013/0047604 A1 * | 2/2013 | Andrasko et al. | 60/602 |
| 2013/0125544 A1 * | 5/2013 | Mond et al. | 60/611 |

FOREIGN PATENT DOCUMENTS

| | | | | |
|---|---|---|---|---|
| JP | 2004108152 A | * | 4/2004 | F02B 37/14 |
| JP | 2004225648 A | * | 8/2004 | F02B 37/14 |
| JP | 2004232541 A | * | 8/2004 | F02B 37/14 |
| JP | 2004293442 A | * | 10/2004 | F02B 37/14 |

* cited by examiner

CONTROL SYSTEMS AND METHODS FOR SUPER TURBO-CHARGED ENGINES

FIELD OF THE INVENTION

The subject invention relates to methods, systems, and computer program products for controlling pressure in a super turbo-charged engine.

BACKGROUND

An internal combustion engine combusts an air and fuel mixture within cylinders to drive pistons, which produces drive torque. Airflow into the engine can be regulated by one or more controlled systems. For example, a turbocharger and/or a supercharger can be controlled to increase the air supplied to the engine. Fuel injection rates can be controlled to provide a desired air/fuel mixture to the cylinders. Increasing the amount of air and fuel provided to the cylinders increases the torque output of the engine.

Accordingly, it is desirable to provide systems and methods for controlling the airflow to the engine.

SUMMARY OF THE INVENTION

In one exemplary embodiment, a method of controlling airflow of an engine system is provided. The method includes: determining a supercharger operating mode and a turbocharger operating mode based on engine load; selectively generating a control signal to a turbocharger based on the turbocharger operating mode; and selectively generating a control signal to a supercharger bypass valve based on the supercharger operating mode.

In another exemplary embodiment, a system for controlling airflow within an engine system is provided. The system includes a first module that determines a turbo charger operating mode and a supercharger operating mode based on engine load. A second module that selectively generates control signals to a turbocharger and a supercharger bypass valve based on the turbocharger operating mode and the supercharger operating mode.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
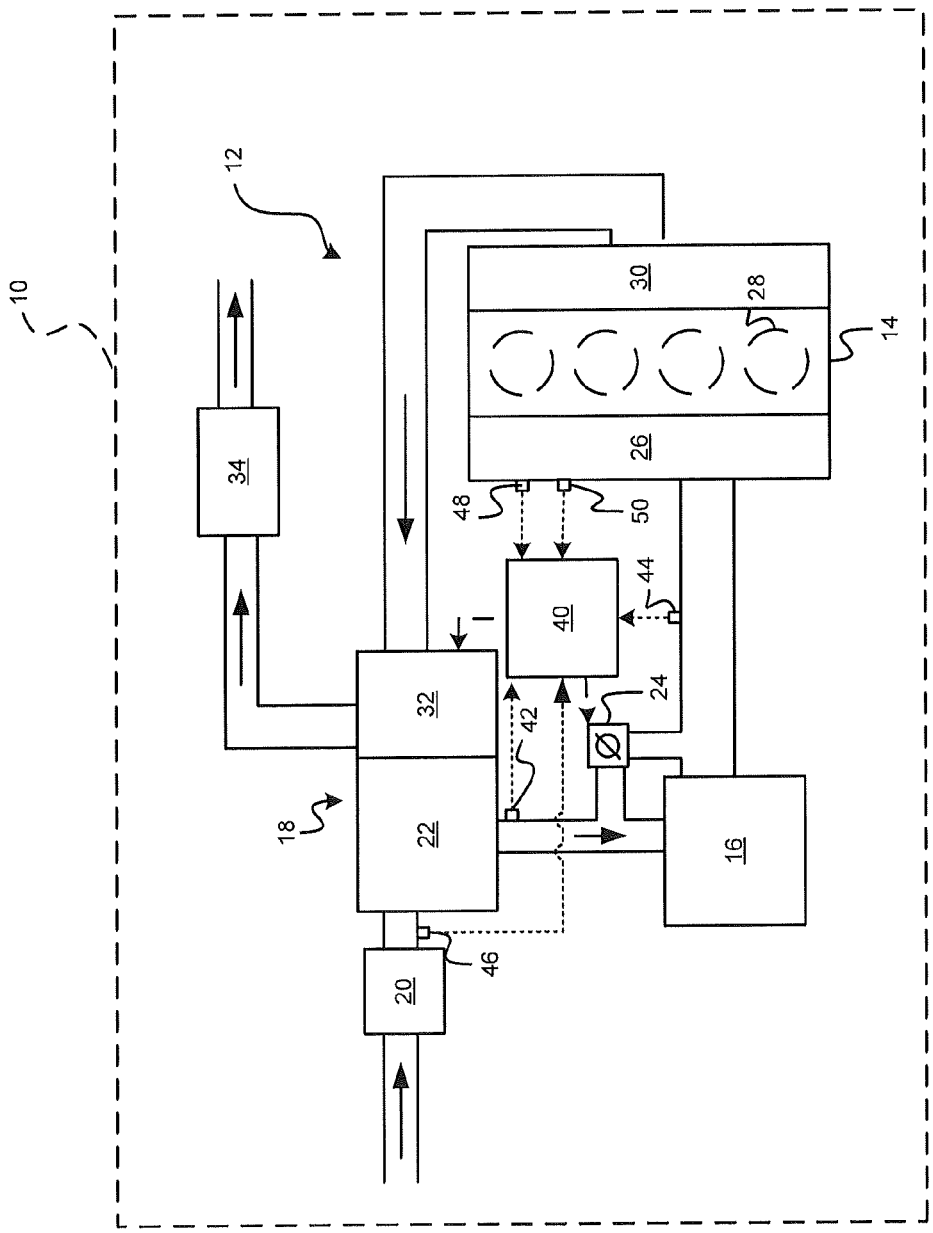
FIG. 1 is a functional block diagram illustrating an engine system in accordance with various embodiments.

The following description is merely exemplary in nature and is not intended to limit the present disclosure, its application or uses. It should be understood that throughout the drawings, corresponding reference numerals indicate like or corresponding parts and features. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

In accordance with exemplary embodiments, a vehicle 10 is shown to include a super turbo-charged engine system 12. The engine system 12 includes an engine 14, a supercharger 16, and a turbocharger 18. As can be appreciated, the engine 14 can be a diesel engine, gasoline engine, or other engine and is not limited to the present example.

Air enters the engine 14 through an air filter 20, which may include a mass airflow meter or other sensors (not shown). The air is compressed within a compressor 22 of the turbocharger 18. The turbocharger 18 may include a variable geometry turbocharger (VGT), a variable nozzle turbocharger (VNT), a variable vane turbocharger (VVT), a fixed geometry wastegate turbocharger, a sliding vane turbocharger, or another suitable type of turbocharger. For exemplary purposes the disclosure will be discussed in the context of a VVT.

A supercharger bypass valve 24 is disposed between the supercharger 16 and the turbocharger 18. When controlled to a first position (e.g., a closed position, or other position), the bypass valve 24 permits air to flow from the compressor 22 through the supercharger 16, to further compress the air. When controlled to a second position (e.g., an open position or other position), the bypass valve 24 bypasses air flowing through the supercharger and directs the air to flow through an alternate path, to prevent further compression of the air. The compressed air, from the turbocharger 18 and/or the supercharger 16, may then pass through one or more air coolers (not shown) or other conditioners (not shown) before being drawn into the engine 14 through an intake manifold 26.

The air is combined with fuel in cylinders 28 of the engine 14 to produce drive torque. Although four cylinders 28 are illustrated, it is appreciated that engines having any number of cylinders 28 are contemplated to be within the scope of the invention, including engines having 2, 4, 6, 8, 10, 12 and 16 cylinders arranged in an inline, flat, or v-type configuration. Exhaust gas exits the cylinders 28 through an exhaust manifold 30 and enters an exhaust inlet side of the turbocharger 18 that includes a turbine 32. The turbine 32 of the turbocharger 18 can be controlled to regulate the flow, the velocity, and/or the pressure of the air through the compressor 22. The exhaust gas may then flow through one or more exhaust treatment components 34 before being released to the atmosphere.

A control module 40 controls the bypass valve 24 and the turbocharger 18 based on sensed and/or modeled data. In various embodiments, the control module 40 receives various signals and controls the components according to various operating modes.

For example, a first pressure sensor 42 senses the pressure of air from the turbocharger 18 and generates a first pressure signal based thereon. A second pressure sensor 44 senses the pressure of air from the supercharger 16 and generates a second pressure signal based thereon. An air temperature sensor 46 senses a temperature of the air entering the engine system 12 and generates an intake air temperature signal based thereon. A coolant temperature sensor 48 senses a temperature of coolant fluid in the engine 14 and generates a coolant temperature based thereon. An engine speed sensor 50 senses a rotational speed of the engine and generates an engine speed signal based thereon. The control module 40 receives the signals, evaluates engine load and engine speed based on the signals, determines an operating mode based on the engine load, and controls the bypass valve 24 and/or the turbocharger 18 based on the operating mode.

Figure 2:
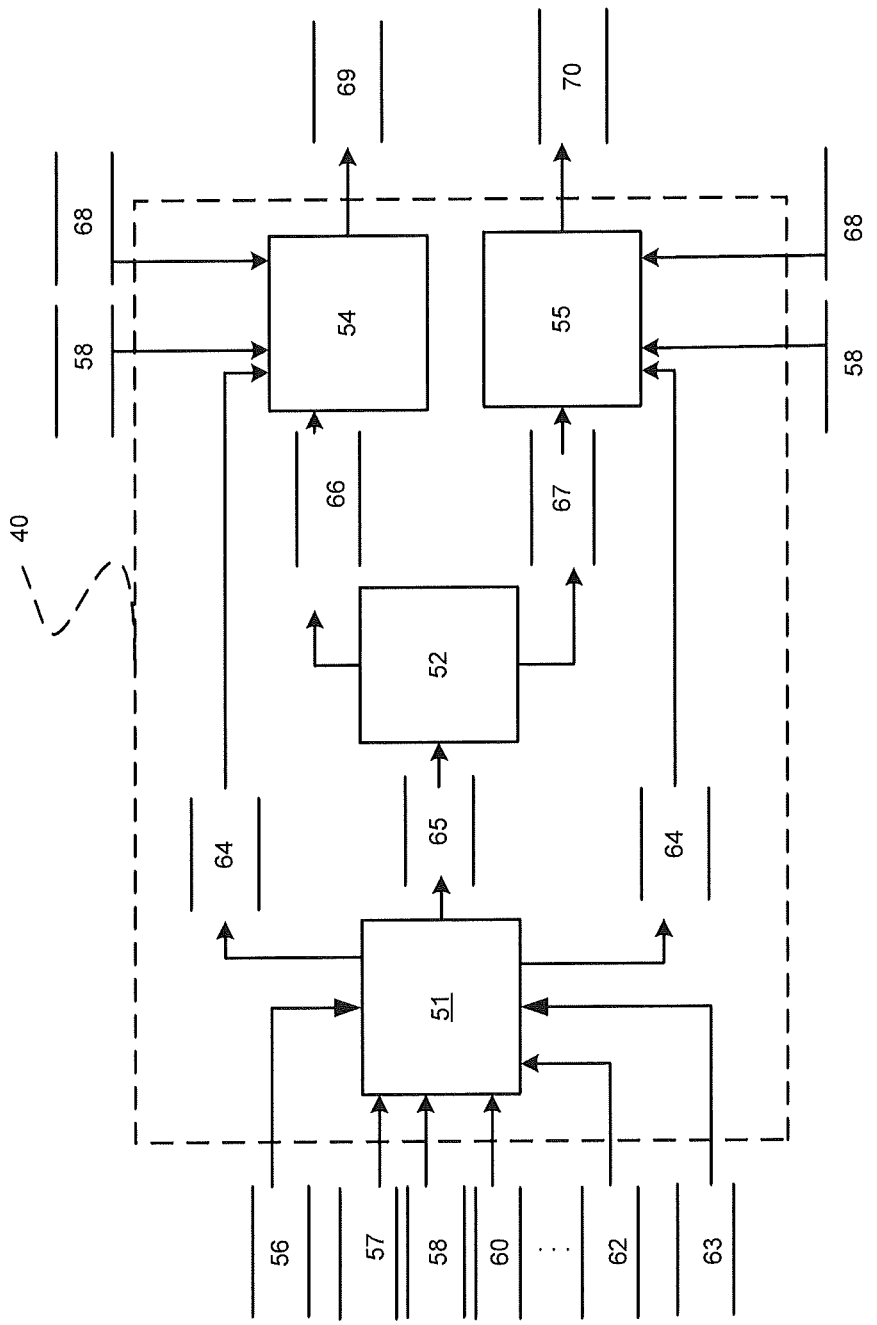
FIG. 2 is a dataflow diagram illustrating an engine control system of the engine system in accordance with various embodiments.

Referring now to FIG. 2, and with continued reference to FIG. 1, a dataflow diagram illustrates various embodiments of a control system that may be embedded within the control module 40. Various embodiments of control systems according to the present disclosure may include any number of sub-modules embedded within the control module 40. As can be appreciated, the sub-modules shown in FIG. 2 may be combined and/or further partitioned to similarly control the flow of exhaust through the supercharger 16 and/or turbocharger 18. Inputs to the control module 40 may be sensed from the engine system 12, received from other control modules (not shown), and/or determined/modeled by other sub-modules (not shown) within the control module. In various embodiments, the control module 40 includes load status determination module 51, a mode determination module 52, a TC control module 54, and a bypass valve control module 55.

The load status determination module 51 receives as input various engine operating parameters, such as, but not limited to, engine torque 56, fueling rate 57, engine speed 58, and intake air temperature 60, and coolant temperature 62. Based on the operating parameters 56-62, the load status determination module 51 determines an engine load 64. Based on the engine load 64, the load status determination module 51 determines an engine load status 65 to be one of a low load, a high load, and a transient load.

For example, the load status determination module 51 determines the engine load status 65 to be the low load based on various engine maps. For example, the maps can be lookup tables that indicate the engine load 64 based on the engine speed 58 and the fuel rate 56. The engine load 64 can be compared with a predetermined threshold to determine whether the load is low.

In another example, the load status determination module 51 determines the engine load status 65 to be the high load based on various engine maps. For example, the maps can be lookup tables that indicate the engine load 64 based on the engine speed 58 and the fuel rate 56. The engine load 64 can be compared with a predetermined threshold to determine whether the load is high.

In yet another example, the load status determination module 51 determines the engine load status 65 to be the transient load when: the engine speed 58 and/or engine torque 56 are changing rapidly; pressure after the supercharger 16 is less than a threshold; and pressure deviation before the supercharger 16 is greater than a threshold.

The mode determination module 52 receives as input the engine load status 65. Based on the engine load status 65, the mode determination module 52 determines a turbocharger (TC) operating mode 66 and a supercharger (SC) operating mode 67. The operating modes 66, 67 can be one of a closed loop mode, and an open loop mode. For example, when the engine load status 65 indicates low load, the mode determination module 52 determines the TC mode 66 to be the open loop mode (i.e., a feed forward operation with a pre-determined control signal), and determines the SC mode 67 to be the closed loop mode (i.e., operation with a pressure or airflow feedback control signal).

In another example, when the engine load status 65 indicates high load, the mode determination module 52 determines the TC mode 66 to be the closed loop mode (i.e., operation with a pressure or airflow feedback control signal), and determines the SC mode 67 to be the open loop mode (i.e., operation with a pre-determined control signal). In yet another example, when the engine load status 65 indicates transient load, the mode determination module 52 determines the TC mode 66 to be the closed loop mode (i.e., operation with a pressure or airflow feedback control signal), and the SC mode 67 to be the closed loop (i.e. operation with a pre-determined control signal).

The TC control module 54 receives as input the TC mode 66, the engine load 64, the engine speed 58, and airflow and/or pressure (MAP requirements 68. Based on the TC mode 66, the TC control module 54 generates control signals 68 to the turbocharger 18 to control, for example, a position of the vanes in the turbine 32 (i.e., when a VVT is implemented). For example, when the TC mode 66 is the open loop mode, the TC control module 54 generates control signals 69 that control the vanes to a particular set point that restricts compression by the compressor 22, thus decreasing airflow from the turbocharger 18. The set points can be determined, for example, from the engine load 64 and the engine speed 58 using, for example, a map.

In another example, when the TC mode 66 is the closed loop mode, the TC control module 54 generates control signals 69 that control the vanes to a particular set point that permits compression by the compressor 22, thus regulating the airflow from the turbocharger 18 to satisfy engine airflow and MAP requirements 68. For example, input from a feedback controller (not shown) may be evaluated to determine whether the set points meet the airflow and/or MAP requirements 68.

The bypass valve control module 55 receives as input the SC mode 67, the engine load 64, the engine speed 58, and the airflow and/or pressure (MAP) requirements 68. Based on the SC mode 67, the bypass valve control module 55 generates control signals 70 to the bypass valve 24. For example, when the SC mode 67 is the open loop mode, the bypass valve control module 55 generates control signals 70 to control the bypass valve 24 to a position that restricts compression by the supercharger 16. Thus, the engine airflow and/or MAP requirements are maintained primarily by the turbocharger 18. The position can be determined, for example, from the engine load 64 and the engine speed 58 using, for example, a map. As can be appreciated, depending on the valve type, the control signals 70 can be generated such that the bypass valve 24 is in a fully open position, a fully closed position, and/or positions there between.

In another example, when the SC mode 67 is the closed loop mode, the bypass valve control module 55 generates control signals 70 to control the bypass valve 24 to a position that regulates compression by the supercharger 16. Thus, the engine airflow and/or MAP requirements 68 are maintained primarily by the supercharger 16. For example, input from a feedback controller (not shown) may be evaluated to determine whether the current position meets the airflow and/or MAP requirements 68.

Figure 3:
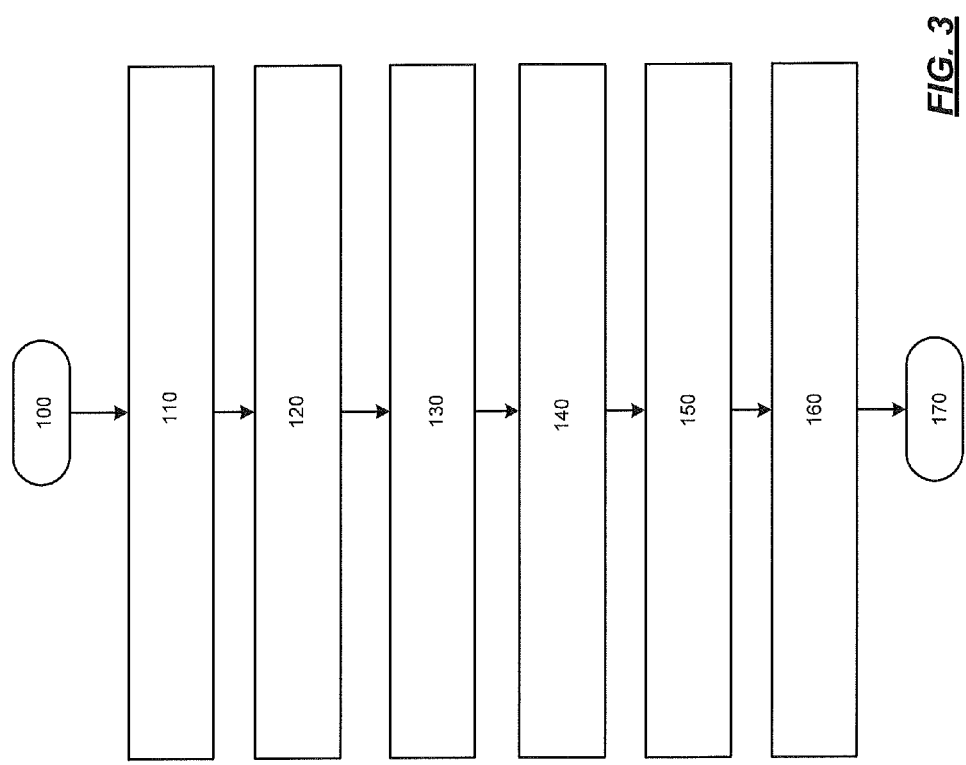
FIG. 3 is a flowchart illustrating an engine control method that can be performed by the engine control system in accordance with various embodiments.

Referring now to FIG. 3, and with continued reference to FIGS. 1 and 2, a flowchart illustrates a control method that can be performed by the control module 40 of FIG. 1 in accordance with the present disclosure. As can be appreciated in light of the disclosure, the order of operation within the method is not limited to the sequential execution as illustrated in FIG. 3, but may be performed in one or more varying orders as applicable and in accordance with the present disclosure.

In various embodiments, the method can be scheduled to run based on predetermined events, and/or run continually during operation of the engine 14.

In one example, the method may begin at 100. The signals are received at 110. The engine load 64 and the engine load status 65 are determined based on the signals at 120. The TC operating mode 66 and the SC operating mode 67 are determined at 130 and 140. The turbocharger control signals 68 are determined and generated based on the TC operating mode 66 at 150. The bypass valve control signals 70 are determined and generated based on the SC operating mode 67 at 160. Thereafter, the method may end at 170.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method of controlling airflow of an engine system, comprising:
    determining a supercharger operating mode of a supercharger and a turbocharger operating mode of a turbocharger based on engine load of the engine system;
    selectively generating a control signal to control a turbine of the turbocharger to adjust a compression of air by a compressor based on the turbocharger operating mode; and
    selectively generating a control signal to control a supercharger bypass valve based on the supercharger operating mode, the supercharger bypass valve disposed between the turbocharger and the supercharger in the engine system;
        wherein controlling the turbine of the turbocharger permits the compression of air by the compressor of the turbocharger as a function of at least one of an engine airflow requirement and a pressure requirement when the turbocharger operating mode is a closed loop mode; and
        wherein controlling the turbine of the turbocharger restricts the compression of air by the compressor of the turbocharger as a function of engine load and engine speed when the turbocharger operating mode is an open loop mode.

2. The method of claim 1, further comprising determining an engine load status to be at least one of a low load status, a high load status, and a transient load status based on the engine load.

3. The method of claim 2, wherein when the supercharger operating mode is the closed loop mode, the control signal to the supercharger bypass valve controls a compression of air by the supercharger, via a position of the supercharger bypass valve, based on at least one of an engine airflow requirement and a pressure requirement.

4. The method of claim 2, wherein when the supercharger operating mode is the open loop mode, the control signal to the supercharger bypass valve restricts the compression of air by the supercharger, via a position of the supercharger bypass valve, based on the engine load and the engine speed.

5. The method of claim 1, wherein the supercharger operating mode is determined to be one of the closed loop mode and the open loop mode.

6. The method of claim 1, wherein the turbocharger operating mode and the supercharger operating mode are each determined to be one of the open loop mode and the closed loop mode.

7. The method of claim 6, wherein the supercharger operating mode is determined to be the open loop mode and the turbocharger operating mode is determined to be the closed loop mode.

8. The method of claim 6, wherein the supercharger operating mode is determined to be the closed loop mode and the turbocharger operating mode is determined to be the open loop mode.

9. The method of claim 1, wherein the engine load is determined as a function of at least one of modeled data and sensor data from sensors disposed in the engine system.

10. The method of claim 1, wherein positions of the supercharger bypass valve range from fully closed to fully opened.

11. A system for controlling airflow within an engine system, comprising:
    a supercharger bypass valve disposed between a turbocharger and a supercharger of the engine system; and
    an electronic control system including a non-transitory computer storage medium having stored data of executable instructions to:
        determine a turbocharger operating mode of the turbocharger and a supercharger operating mode of the supercharger based on an engine load;
        selectively generate a control signal to control a turbine the turbocharger to adjust a compression of air by a compressor based on the turbocharger operating mode; and
        selectively generate a control signal to control the supercharger bypass valve based on the supercharger operating mode;
            wherein when the turbocharger operating mode is a closed loop mode, the control signal to control the turbine of the turbocharger permits the compression of air by the compressor of the turbocharger as a function of at least one of an engine airflow requirement and a pressure requirement; and
            wherein when the turbocharger operating mode is an open loop mode, the control signal to control the turbine of the turbocharger restricts the compression of air by the compressor of the turbocharger as a function of the engine load and an engine speed.

12. The system of claim 11, wherein the non-transitory computer storage medium having stored data of the executable instructions includes an executable instruction to determine an engine load status to be at least one of a low load status, a high load status, and a transient status.

13. The system of claim 11, wherein the non-transitory computer storage medium having stored data of the executable instructions includes an executable instruction to determine the supercharger operating mode to be one of the closed loop mode, and the open loop mode.

14. The system of claim 13, wherein when the supercharger operating mode is the closed loop mode, the non-transitory computer storage medium having stored data of the executable instructions includes an executable instruction to generate the control signal to control the supercharger bypass valve to control compression of air by the supercharger, via a position of the supercharger bypass valve based on at least one of an engine airflow requirement and a pressure requirement.

15. The system of claim 13, wherein when the supercharger operating mode is the open loop mode, the executable instruction to generate the control signal to control the supercharger bypass valve to restrict the compression of air by the supercharger, via a position of the supercharger bypass valve, based on the engine speed and the engine load.

16. The system of claim 11, wherein the non-transitory computer storage medium having stored data of the executable instructions includes an executable instruction to determine the turbocharger operating mode and the supercharger operating mode to be one of the open loop mode and the closed loop mode.

17. The system of claim 11, wherein the engine load is determined as a function of at least one of modeled data and sensor data from sensors disposed in the engine system.

18. The system of claim 11, wherein positions of the supercharger bypass valve range from fully closed to fully opened.

* * * * *